United States Patent
Gonzales, Jr.

(10) Patent No.: US 10,930,094 B2
(45) Date of Patent: Feb. 23, 2021

(54) ACTION BASED ON REPETITIONS OF AUDIO SIGNALS

(71) Applicant: eBay Inc., San Jose, CA (US)

(72) Inventor: Sergio Pinzon Gonzales, Jr., San Jose, CA (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/217,389

(22) Filed: Dec. 12, 2018

(65) Prior Publication Data

US 2019/0114850 A1 Apr. 18, 2019

Related U.S. Application Data

(63) Continuation of application No. 15/827,872, filed on Nov. 30, 2017, now Pat. No. 10,176,647, which is a
(Continued)

(51) Int. Cl.
| | |
|---|---|
| *G07C 5/08* | (2006.01) |
| *G10L 25/51* | (2013.01) |
| *G10L 25/21* | (2013.01) |
| *G06F 16/63* | (2019.01) |
| *H04R 29/00* | (2006.01) |
| *G07C 5/00* | (2006.01) |
| *G10L 25/18* | (2013.01) |
| *G06F 16/683* | (2019.01) |
| *G06F 16/638* | (2019.01) |

(52) U.S. Cl.
CPC ........... *G07C 5/0808* (2013.01); *G06F 16/63* (2019.01); *G06F 16/638* (2019.01); *G06F 16/683* (2019.01); *G07C 5/006* (2013.01); *G07C 5/0816* (2013.01); *G10L 25/18* (2013.01); *G10L 25/21* (2013.01); *G10L 25/51* (2013.01); *H04R 29/00* (2013.01)

(58) Field of Classification Search
CPC .... G07C 5/0808; G07C 5/006; G07C 5/0816; G06F 17/30743; G06F 16/63; G06F 16/638; G06F 16/683; G10L 25/18; G10L 25/21; G10L 25/51; H04R 29/00
See application file for complete search history.

(56) References Cited

U.S. PATENT DOCUMENTS

| | | |
|---|---|---|
| 6,249,215 B1 | 6/2001 | Dilz et al. |
| 6,775,642 B2 | 8/2004 | Remboski et al. |
| (Continued) | | |

FOREIGN PATENT DOCUMENTS

| | | |
|---|---|---|
| CN | 1661343 A | 8/2005 |
| CN | 102486646 A | 6/2012 |
| (Continued) | | |

OTHER PUBLICATIONS

Amendment filed on Jan. 21, 2019, for Korean Patent Application No. 10-2019-7001789, 3 pages. (Official Copy Only).
(Continued)

*Primary Examiner* — Mark Fischer
(74) *Attorney, Agent, or Firm* — Holland & Hart LLP (57) ABSTRACT

Methods, systems, and apparatus for monitoring a sound are described. An audio signal is obtained and the audio signal is analyzed to generate an audio signature. An object type is identified based on the audio signature and an action corresponding to the object type is identified.

20 Claims, 8 Drawing Sheets

Related U.S. Application Data continuation of application No. 14/986,243, filed on Dec. 31, 2015, now Pat. No. 9,843,877.

(56) References Cited

U.S. PATENT DOCUMENTS

| | | | |
|---|---|---|---|
| 7,904,219 | B1 | 3/2011 | Lowrey et al. |
| 8,874,305 | B2 | 10/2014 | Dolgov et al. |
| 8,983,677 | B2 | 3/2015 | Wright et al. |
| 9,129,460 | B2 | 9/2015 | McClellan et al. |
| 9,843,877 | B2 | 12/2017 | Gonzales, Jr. |
| 10,176,647 | B2 | 1/2019 | Gonzales, Jr. |
| 10,388,086 | B2 | 8/2019 | Gonzales, Jr. |
| 2004/0015251 | A1 | 1/2004 | Hamada et al. |
| 2004/0136539 | A1 | 7/2004 | Uhi et al. |
| 2005/0192723 | A1 | 9/2005 | Noguchi |
| 2006/0253282 | A1 | 11/2006 | Schmidt et al. |
| 2007/0038448 | A1* | 2/2007 | Sherony .......... G01S 5/0252 704/240 |
| 2007/0093947 | A1 | 4/2007 | Gould et al. |
| 2007/0271014 | A1 | 11/2007 | Breed |
| 2008/0030313 | A1 | 2/2008 | Obradovich |
| 2008/0201032 | A1 | 8/2008 | Fayyad et al. |
| 2008/0319602 | A1 | 12/2008 | McClellan et al. |
| 2009/0177354 | A1 | 7/2009 | Agrawal et al. |
| 2010/0080086 | A1 | 4/2010 | Wright et al. |
| 2010/0114423 | A1 | 5/2010 | Boss et al. |
| 2010/0134296 | A1* | 6/2010 | Hwang .......... A47K 5/1217 340/573.1 |
| 2010/0142715 | A1 | 6/2010 | Goldstein et al. |
| 2010/0217684 | A1* | 8/2010 | Melcher .......... G06Q 30/0601 705/26.1 |
| 2011/0112717 | A1 | 5/2011 | Resner |
| 2011/0130915 | A1 | 6/2011 | Wright et al. |
| 2012/0071151 | A1 | 3/2012 | Abramson et al. |
| 2012/0083959 | A1 | 4/2012 | Dolgov et al. |
| 2012/0089299 | A1 | 4/2012 | Breed |
| 2012/0143431 | A1 | 6/2012 | Kim et al. |
| 2012/0226390 | A1 | 9/2012 | Adams et al. |
| 2012/0330499 | A1 | 12/2012 | Scheid et al. |
| 2013/0055300 | A1* | 2/2013 | Hanina .......... H04H 60/32 725/10 |
| 2013/0290018 | A1* | 10/2013 | Anderson .......... G06Q 10/10 705/2 |
| 2014/0086419 | A1 | 3/2014 | Rana et al. |
| 2015/0120336 | A1 | 4/2015 | Grokop et al. |
| 2015/0170439 | A1 | 6/2015 | Chen et al. |
| 2015/0218872 | A1 | 8/2015 | Breed |
| 2015/0269792 | A1 | 9/2015 | Wood |
| 2015/0371462 | A1 | 12/2015 | Ramesh |
| 2016/0104486 | A1 | 4/2016 | Penilla et al. |
| 2016/0163130 | A1 | 6/2016 | Zagajac et al. |
| 2016/0196264 | A1* | 7/2016 | Bostick .......... G06F 16/48 707/706 |
| 2016/0343180 | A1 | 11/2016 | Talwar et al. |
| 2017/0050750 | A1 | 2/2017 | Barraci et al. |
| 2017/0109944 | A1 | 4/2017 | Barajas Gonzalez et al. |
| 2017/0193714 | A1 | 7/2017 | Gonzales, Jr. |
| 2017/0195810 | A1 | 7/2017 | Gonzales, Jr. |
| 2018/0089913 | A1 | 3/2018 | Gonzales, Jr. |
| 2018/0310780 | A1* | 11/2018 | Mahaffey .......... G01H 17/00 |
| 2019/0164565 | A1* | 5/2019 | Jones .......... G10L 25/51 |
| 2019/0251763 | A1 | 8/2019 | Gonzales, Jr. |

FOREIGN PATENT DOCUMENTS

| | | |
|---|---|---|
| JP | 2013200143 A | 10/2013 |
| WO | 2017/223108 A1 | 12/2017 |

OTHER PUBLICATIONS

Applicant Initiated Interview summary received for U.S. Appl. No. 14/986,243, dated Apr. 12, 2017, 3 pages.

Non-Final Office Action received for U.S. Appl. No. 14/986,243, dated Mar. 9, 2017, 12 pages.

Notice of Allowance received for U.S. Appl. No. 14/986,243, dated Aug. 9, 2017, 5 pages.

Response to Non-Final Office Action filed on Jul. 20, 2017 for U.S. Appl. No. 14/986,243, dated Mar. 9, 2017, 10 pages.

Advisory Action received for U.S. Appl. No. 15/186,974, dated Aug. 28, 2018, 3 pages.

Applicant Initiated Interview Summary Received for U.S. Appl. No. 15/186,974 dated Nov. 27, 2017, 3 pages.

Applicant Initiated Interview Summary received for U.S. Appl. No. 15/186,974, dated Aug. 28, 2018, 3 pages.

Applicant Initiated Interview Summary received for U.S. Appl. No. 15/186,974, dated Feb. 20, 2018, 3 pages.

Final Office Action received for U.S. Appl. No. 15/186,974, dated Jun. 13, 2018, 11 pages.

Final Office Action received for U.S. Appl. No. 15/186,974, dated Sep. 18, 2017, 12 pages.

First Action Interview—Pre-Interview Communication received for U.S. Appl. No. 15/186,974, dated Jul. 10, 2017, 5 pages.

First Action Interview—Office Action Summary received for U.S. Appl. No. 15/186,974, dated Aug. 7, 2017, 8 pages.

Non-Final Office Action received for U.S. Appl. No. 15/186,974, dated Dec. 26, 2017, 9 pages.

Notice of Allowance received for U.S. Appl. No. 15/186,974, dated Dec. 18, 2018, 9 pages.

Notice of Allowance received for U.S. Appl. No. 15/186,974, dated Feb. 6, 2019, 5 pages.

Preliminary Amendment received for U.S. Appl. No. 15/186,974, filed Jun. 20, 2017, 3 pages.

Response to Advisory Action filed on Sep. 13, 2018 for U.S. Appl. No. 15/186,974, dated Aug. 28, 2018, 8 pages.

Response to Final Office Action filed on Aug. 6, 2018, for U.S. Appl. No. 15/186,974, dated Jun. 13, 2018, 7 pages.

Response to Final Office Action filed on Nov. 30, 2017 for U.S. Appl. No. 15/186,974 dated Sep. 18, 2017, 8 pages.

Response to Non-final Office Action filed on Mar. 26, 2018, for U.S. Appl. No. 15/186,974, dated Dec. 26, 2017, 10 pages.

Response to Pre-Interview First Office Action Communication filed on Aug. 10, 2017 for U.S. Appl. No. 15/272,983 dated Jul. 10, 2017, 16 pages.

Applicant Initiated Interview Summary received for U.S. Appl. No. 15/827,872, dated Jun. 20, 2018, 3 pages.

Non-Final Office Action Received for U.S. Appl. No. 15/827,872 dated Apr. 5, 2018, 11 pages.

Notice of Allowance received for U.S. Appl. No. 15/827,872, dated Aug. 29, 2018, 5 pages.

Response to Non-Final Office Action filed on Jul. 2, 2018, for U.S. Appl. No. 15/827,872, dated Apr. 5, 2018, 8 pages.

Madain, et al., "Fault Diagnosis in Vehicle Engines Using Sound Recognition Techniques", 2010, 4 pages.

International Preliminary Report on Patentability received for PCT Application No. PCT/US2017/038370, dated Jan. 3, 2019, 7 pages.

International Written Opinion received for PCT Application No. PCT/US2017/038370, dated Oct. 13, 2017, 5 pages.

International Search Report received for PCT Application No. PCT/US2017/038370, dated Oct. 13, 2017, 2 pages.

Voluntary Amendment filed on Apr. 26, 2019, for Chinese Patent Application No. 201780037933.X, 6 pages (3 pages of Official copy and 3 pages of English Translation).

Non-Final Office Action recieved for U.S. Appl. No. 16/396,863, dated Oct. 1, 2019, 11 pages.

Response to Non-Final Office Action filed on Dec. 23, 2019, for U.S. Appl. No. 16/396,863, dated Oct. 1, 2019, 9 pages.

Response to Office Action filed on Mar. 6, 2020, for Korean Patent Application No. 10-2019-7001789, dated Jan. 6, 2020, 13 pages (10 pages of Official Copy & 3 pages of English Pending Claims).

Office Action received for Chinese Patent Application No. 201780037933.X, dated Mar. 4, 2020, 14 pages (7 pages of Official Copy and 7 pages of English Translation).

Response to Final Office Action filed on Mar. 16, 2020, for U.S. Appl. No. 16/396,863, dated Jan. 30, 2020, 7 pages.

(56) References Cited

OTHER PUBLICATIONS

Office Action Received for Korean Patent Application No. 10-2019-7001789, dated Jan. 6, 2020, 5 pgs.
Extended European search report Received for European Patent Application No. 17816076.8, dated Jan. 21, 2020, 11 pgs.
Final Office Action received for U.S. Appl. No. 16/396,863, dated Jan. 30, 2020, 7 pgs.
Response to Notice of Allowance filed on May 20, 2020, for U.S. Appl. No. 16/396,863, dated Mar. 25, 2020, 7 pages.
Non-Final Office Action received for U.S. Appl. No. 16/396,863, dated Jun. 5, 2020, 6 pages.
Notice of Allowance received for U.S. Appl. No. 16/396,863, dated Mar. 25, 2020, 8 pages.
Office Action received for Korean Patent Application No. 10-2019-7001789, dated Jul. 30, 2020, 7 pages (4 Pages of Official Copy and 3 Pages of English Translation).
Response to Non-Final Office Action filed on Sep. 2, 2020 for U.S. Appl. No. 16/396,863, dated Jun. 5, 2020, 9 Pages.
Response to Extended European Search Report filed on Aug. 10, 2020, for European Patent Application No. 17816076.8, dated Jan. 21, 2020, 9 pages.
Response to Office Action filed on Jul. 14, 2020, for Chinese Patent Application No. 201780037933.X, dated Mar. 4, 2020, 10 Pages (7 Page of Official Copy only & 3 pages of Claims Copy).
Advisory Action received for U.S. Appl. No. 16/396,863, dated Dec. 14, 2020, 4 pages.
Office Action Received for Chinese Patent Application No. 201780037933.X, dated Nov. 17, 2020, 18 pages (10 pages of English Translation and 8 pages of Official copy only).

* cited by examiner

| Identifier | Object | Object Type | Char 1 | Char 2 | Char 3 |
|---|---|---|---|---|---|
| 255600 | Carnegie Hall | Auditorium (Singer) | | | |
| 255601 | Carnegie Hall | Auditorium (Person) | | | |
| 255602 | Syndney Opera | Auditorium | | | |
| 255603 | | Tire | Exposed Belt | Worn | |
| 255604 | | Tire | Poor Tread | Worn | |
| 255605 | | Ford Model A | | | |
| 255606 | | Blender | High Setting | | |
| 255607 | | Blender | Low Setting | | |
| 255608 | | Washing Machine | Cycle 1 | Fill | |
| 255609 | | Washing Machine | Cycle 2 | Wash | |
| 255610 | | Washing Machine | Cycle 3 | Rinse | Leak |

| Identifier | Signature | Object Type | Char 1 | Condition | Action |
|---|---|---|---|---|---|
| 100 | 255603 | TIRE | EXPOSED BELT | | ISSUE WARNING |
| 101 | 255605 | FORD MODEL A | | | ISSUE ID |
| 102 | 255606 | BLENDER | | | |
| | 255708 | HOME THEATRE | | | DIM LIGHTS |
| 103 | 255608 | WASH MACH | CYCLE 1 | 40 TIMES | ISSUE NOTICE |
| 104 | 255720 | TELEVISION | | 9PM TO 8AM | ISSUE ALERT |
| 105 | 255606 | BLENDER | HIGH SETTING | | |
| | 255607 | BLENDER | LOW SETTING | | |
| | 255606 | BLENDER | HIGH SETTING | | UPDATE LIST |
| 106 | | | | | |
| 107 | | | | | |

ACTION BASED ON REPETITIONS OF AUDIO SIGNALS

PRIORITY

This application is a continuation of and claims the benefit of priority to U.S. patent application Ser. No. 15/827,872, filed Nov. 30, 2017, which is a continuation of and claims the benefit of priority to U.S. patent application Ser. No. 14/986,243, filed Dec. 31, 2015, each of which is hereby incorporated by reference herein in its entirety.

TECHNICAL FIELD

The present application relates generally to audio processing, and more specifically to sound recognition.

BACKGROUND

Objects emit a variety of sounds audible to the human ear. For example, musical instruments may emit unique sounds when played. A motorcycle may emit a unique sound when throttling. Tires on an automobile may emit a unique sound when they are worn. Sounds may be captured by a microphone, converted to an electrical audio signal, and processed to boost certain frequency bands, to eliminate background noise, and to isolate particular sounds. The generated electrical audio signal may also be recorded and stored for future processing.

BRIEF DESCRIPTION OF THE DRAWINGS

Some embodiments are illustrated by way of example and not limitation in the figures of the accompanying drawings in which.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other example embodiments of the invention exist and are within the scope of the invention, and logical, mechanical, electrical, and other changes may be made without departing from the scope or extent of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

Generally, methods, apparatus, and systems for monitoring a sound and identifying an object, an object type, a characteristic of an object, or any combination thereof, based on the monitored sound are disclosed. A "sound," as used herein, includes sounds detectable by a human ear, as well as sounds detectable by electronic equipment, such as a microphone. As used herein, a "sound" may comprise a plurality of component sounds that occur sequentially, overlap, at least partially, in time, or any combination thereof. A sound emitted by an object is monitored and captured to create an audio signal. The audio signal may be optionally pre-processed to, for example, eliminate background noise, isolate a particular sound, clarify the audio signal, or any combination thereof, and then processed to generate an audio fingerprint The audio fingerprint (also known as an audio signature, or simply signature, hereinafter) is compared to audio signatures in a library of signatures. If a match is found, the monitored object is identified as being the object that corresponds to the signature in the library, as being of the type of object that corresponds to the signature in the library, of having the characteristic that corresponds to the signature in the library, or any combination thereof. In one example embodiment, the monitored object may be identified as having a plurality of characteristics that correspond to the signature in the library.

In one example embodiment, training is conducted to introduce new audio signatures into the signature library. A monitored sound emitted by a known object is captured to create an audio signal. The audio signal may be optionally pre-processed and processed to generate the audio signature. The signature is stored in the signature library and is indexed according to the identity of the object, the type of object, a characteristic(s) of the object, and the like.

In one example embodiment, the audio signal may be optionally pre-processed to isolate a particular sound. For example, a segment of the audio signal may be edited to eliminate sections of the audio clip that do not contain the sound. In addition, a particular sound may be isolated from other sounds that occur contemporaneously, such as background noise or noise introduced by the monitoring equipment.

In one example embodiment, a signature, or "fingerprint," of the isolated audio signal is generated. The signature is generated by considering characteristics of an audio waveform, such as frequency range, tempo (e.g., beats per minute), acoustic resonances, power in each of a plurality of frequency ranges, and the like. The signature may be compared to audio signatures in a library of signatures. If a match is found, the signature is identified as being the object corresponding to the library signature, as being of the object type corresponding to the library signature, as having the characteristic of the object corresponding to the library signature, or any combination thereof. The library may be stored in a database, an archival system, and the like.

In one example embodiment, an action may be recommended, performed, or both based on the audio signature. For example, a listing template for the identified object may be automatically generated based on the audio signature. The listing template may be used to list the item for sale on an electronic commerce marketplace. In this example, the specifications for the object, a suggested listing price, a representative picture of the item, and the like may be prepopulated into the listing template. Similarly, a search query for locating the item on an electronic commerce marketplace may be generated based on the audio signature. In this example, the name of the object, the object type, the characteristics of the object, and the like may be used as search terms in a search query.

An item or service associated with the identified object may also be identified based on the audio signature. For example, wheel bearings of an automobile may emit a distinctive sound just prior to failure. The sounds emitted by the wheel bearings may be captured and processed to identify the condition of the wheel bearings. Maintenance activities, such as replacing the wheel bearings, may be determined and recommended. The recommendation may also be submitted to a user, a service company, and the like.

In another example, a home appliance, such as a clothes washing machine, may cycle through different operations/cycles that emit different sounds. A first cycle may fill the tub with water and may emit a first sound, a second cycle may rotate the tub to create a washing action and may emit a second sound, a third cycle may drain the tub of water and may emit a third sound, a fourth cycle may fill the tub with clean water and may emit the first sound, a fifth cycle may rotate the tub to create a rinsing action and may emit a fourth sound, and a sixth cycle may spin the tub at a high speed to drain the clothes of water and may emit a fifth sound. A time-based record of the emitted signatures may produce a compound audio signature that may be used to identify the type of appliance as a clothes washing machine. A compound audio signature is an audio signature comprising a plurality of component audio signatures, where the component audio signatures occur sequentially, overlap, at least partially, in time, or any combination thereof. Moreover, each component audio signature (such as the audio signature of the first sound) may be used to identify the particular cycle of the washing machine. The identified cycles may be analyzed to, for example, detect abnormalities. In one example embodiment, a cycle which is lasting longer than expected may generate an alarm, such as an electronic notification, to a user. A fill cycle that emits a dripping sound may be indicative of a water leak and may generate an alarm, such as an audible alarm.

In one example embodiment, information derived from the identified audio may be analyzed to determine ancillary information, including user behavior, as described more fully below. For example, if a kitchen blender and stereo system are determined to be powered-on during the same time period (as indicated by sounds emitted by the appliances), it may be inferred that a house party is in progress.

Figure 1:
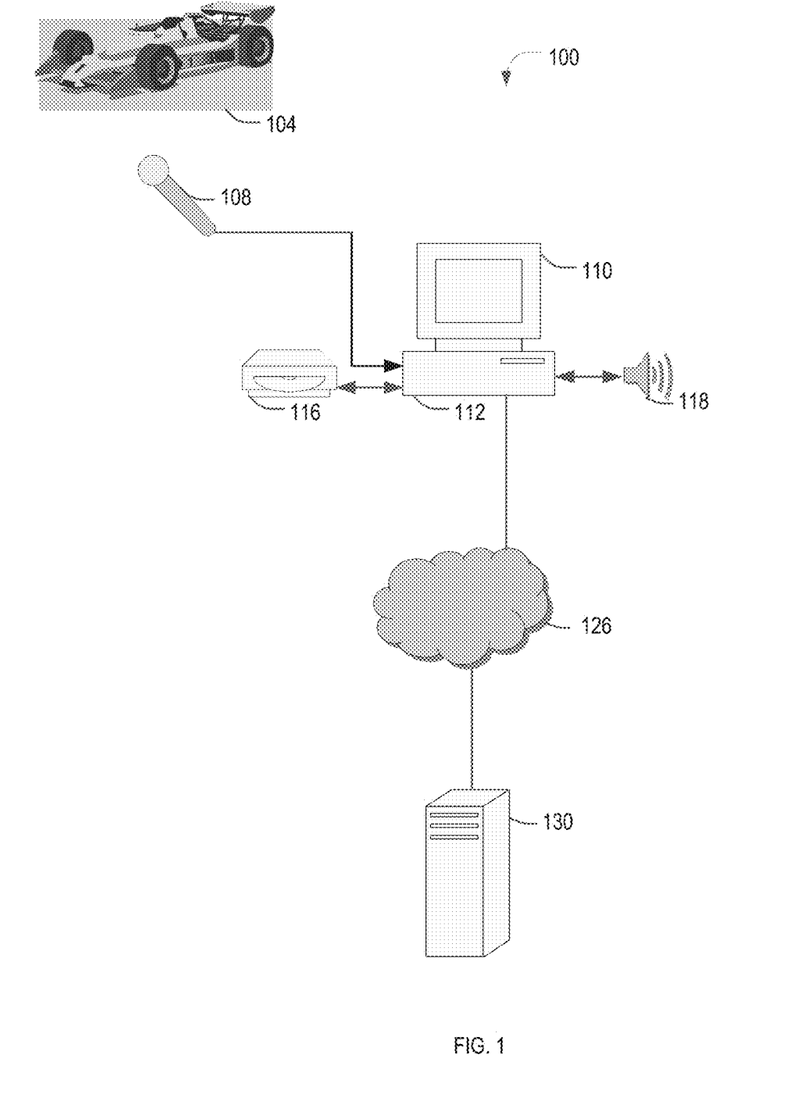
FIG. 1 is a block diagram of an example system for monitoring a sound and identifying an object, an object type, a characteristic of an object, or any combination thereof, based on the monitored sound, in accordance with an example embodiment.

FIG. 1 is a block diagram of an example system 100 for monitoring a sound and identifying an object, an object type, a characteristic of an object, or any combination thereof, based on the monitored sound, in accordance with an example embodiment. In one example embodiment, the system 100 may comprise a microphone 108 and a sound monitor 112.

A sound emitted by a monitored object 104, such as an automobile, a musical instrument, a computer, a human being (such as a baby), and the like, is captured by the microphone 108. The captured sound is converted to an audio signal by the microphone 108 for processing by the sound monitor 112. In one example embodiment, the microphone 108 may communicate with, for example, the sound monitor 112 via a wireless link (e.g., IEEE 802.11), a wired link, and the like.

The sound monitor 112 may be a computer processing system, a server computer, a personal computer (PC), a tablet PC, a personal digital assistant (PDA), a cellular telephone, a smartphone, a smartwatch, or any processing device. As described more fully below in conjunction with FIG. 9, in some embodiments, the computer processing system operates as a standalone device or may be connected (e.g., networked) to other computers 130. In a networked deployment, the computer processing system may operate in the capacity of a server or a client computer in server-client network environment, or as a peer computer in a peer-to-peer (or distributed) network environment.

The sound monitor 112 may include a processor (e.g., a central processing unit (CPU), a graphics processing unit (GPU), and the like) and a memory, which communicate with each other via a bus. The sound monitor 112 may further include a video display 110 (e.g., a plasma display, a liquid crystal display (LCD), or a cathode ray tube (CRT)). The sound monitor 112 also may include an alphanumeric input device (e.g., a keyboard), a user interface (UI) navigation device (e.g., a mouse and/or touch screen), a drive unit, a signal generation device 118 (e.g., a speaker), and a network interface device.

The drive unit, such as a removable drive unit 116, includes a machine-readable medium on which is stored one or more sets of instructions and data structures embodying or utilized by any one or more of the methodologies or functions described herein. The instructions may also reside, completely or at least partially, within the memory and/or within the processor during execution thereof by the computer processing system. The instructions may further be transmitted or received over a network 126 via the network interface device utilizing any one of a number of well-known transfer protocols (e.g., Hypertext Transfer Protocol).

The network 126 may be a local area network (LAN), a wireless network, a metropolitan area network (MAN), a wide area network (WAN), a wireless network, a network of interconnected networks, the public switched telephone network (PSTN), an electrical power-based network (such as the X. 10 protocol), and the like. Communication links include, but are not limited to, Wi-Fi (e.g., IEEE 802.11), Bluetooth, Universal Serial Bus (USB), and the like. In one example embodiment, the network 126 may comprise one or more routers and/or device switches (not shown).

Figure 7A:
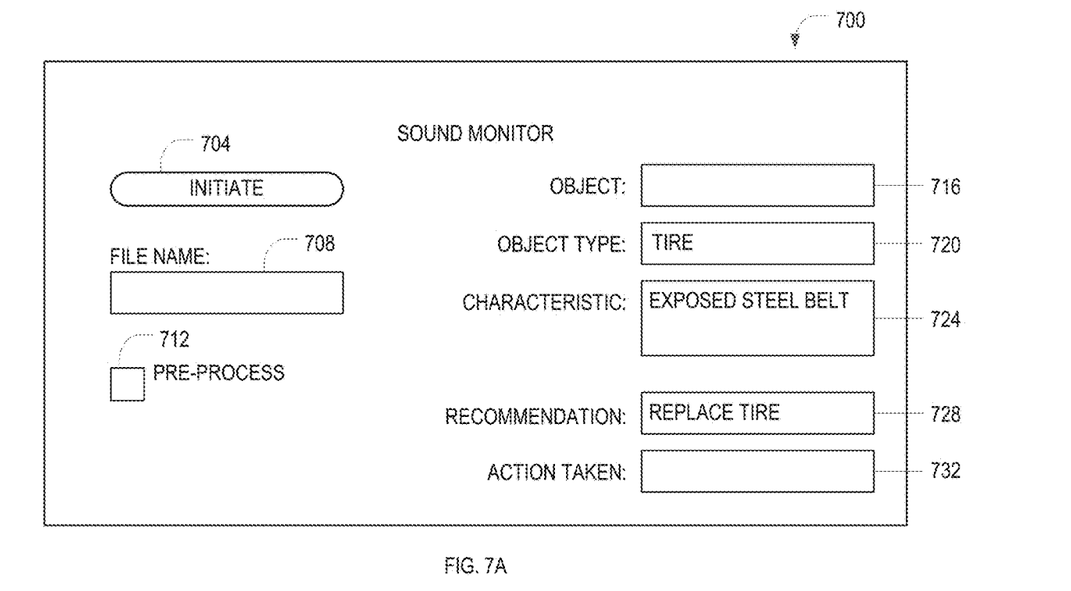
FIG. 7A is an example user interface for monitoring a sound and identifying an object, an object type, a characteristic of an object, or any combination thereof, based on the monitored sound, in accordance with an example embodiment.
Figure 7B:
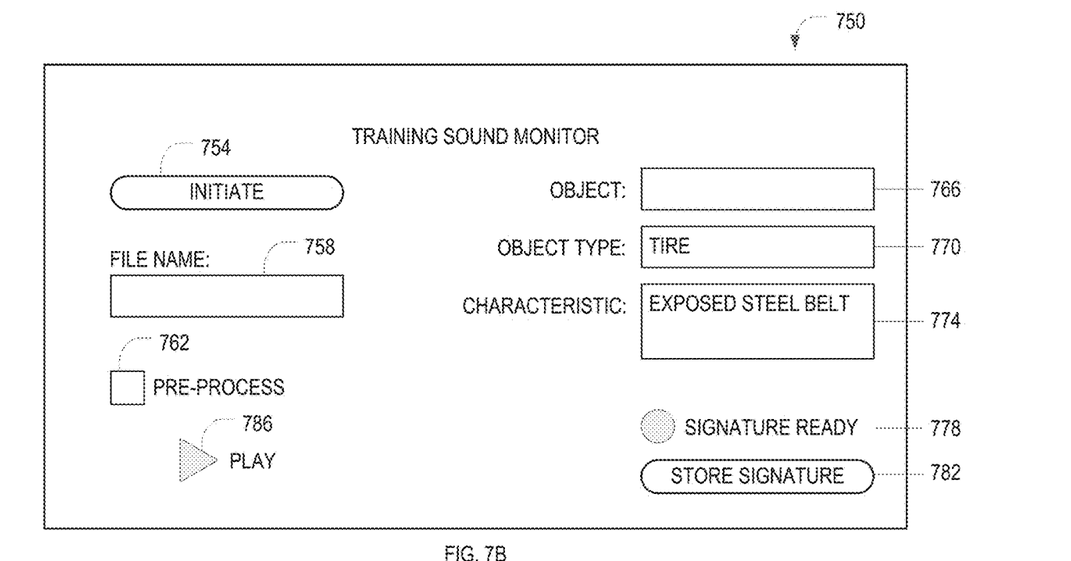
FIG. 7B is an example user interface for training the sound monitor, in accordance with an example embodiment.

The sound monitor 112 optionally generates a user interface, such as the user interfaces of FIGS. 7A and 7B. The user interface of FIG. 7A enables a user to initiate the capture and identification of a sound. The user interface of FIG. 7B enables a user to initiate the training of the sound monitor 112.

The sound monitor 112 receives the audio signal from the microphone 108. The audio signal is optionally pre-processed to, for example, eliminate or mitigate noise or background sounds, and to isolate a particular sound in the audio signal. A signature of the audio signal is then generated. The audio signature is compared to signatures in a library of audio signatures; if a matching signature is found, the object, the object type, the characteristic, or any combination thereof, corresponding to the audio signature from the library is identified and assigned to the monitored object. For example, the sound emitted by an automobile may have a unique sound. An audio signature of the unique sound may be used to identify the make, and possibly model, of the automobile.

In one example embodiment, the sound may be processed upon detection, periodically, at a prescheduled time, in response to a reception of a request, in response to a substantial change in the audio signal, or any combination thereof. In one example embodiment, the audio signal may be sent to a cloud-based service, such as a service operating on computer 130, via the network 126 for processing. The cloud-based service may perform pre-processing, audio processing, signature generation, signature matching, or any combination thereof, as described herein. The audio signal may be sent to the cloud-based service upon detection, periodically, at a prescheduled time, in response to a reception of a request, in response to a substantial change in the audio signal, or any combination thereof.

Figure 2:
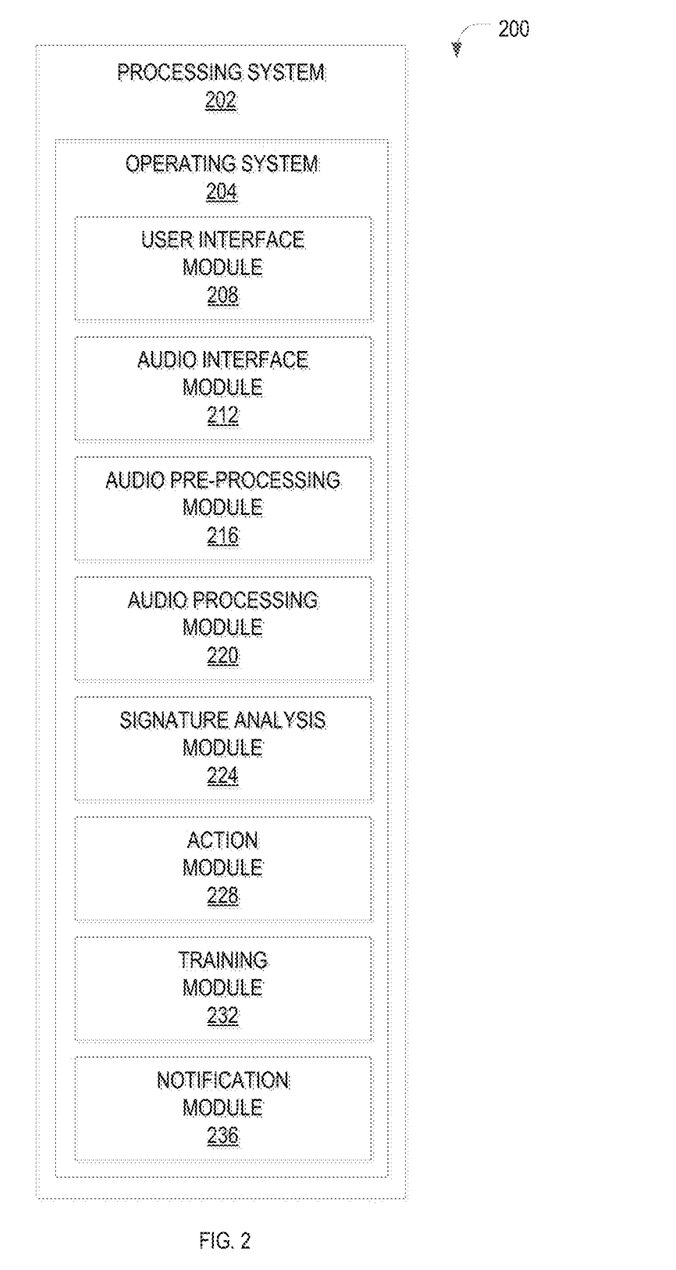
FIG. 2 is a block diagram of an example apparatus for monitoring a sound and identifying an object, an object type, a characteristic of an object, or any combination thereof, based on the monitored sound, in accordance with an example embodiment.

FIG. 2 is a block diagram of an example apparatus 200 for monitoring a sound and identifying an object, an object type, a characteristic of an object, or any combination thereof, based on the monitored sound, in accordance with an example embodiment. In one example embodiment, the apparatus 200 may serve as the sound monitor 112.

The apparatus 200 is shown to include a processing system 202 that may be implemented on a server, client, or other processing device that includes an operating system 204 for executing software instructions. In accordance with an example embodiment, the apparatus 200 may include a user interface module 208, an audio interface module 212, an audio pre-processing module 216, an audio processing module 220, a signature analysis module 224, an action module 228, a training module 232, and a notification module 236.

The user interface module 208 provides an interface(s) for initiating the identification of an object based on a monitored sound. The user interface module 208 provides for initiating, recommending, or both an action based on the sound, corresponding audio signature, or both, as described more fully below in conjunction with FIG. 7A. The user interface module 208 also provides an interface for initiating training of the sound monitor 112, as described more fully below in conjunction with FIG. 7B.

The audio interface module 212 provides an interface for obtaining an audio signal, such as an audio signal captured by microphone 108. The audio interface module 212 may receive a recorded audio signal from, for example, the computer 130 via the network 126. The audio interface module 212 may, for example, convert an analog audio signal to a digital audio signal, as described herein.

The audio pre-processing module 216 optionally processes the audio signal to isolate a particular sound. For example, a segment of the audio signal may be edited from a longer audio clip, a particular sound may be isolated from other sounds that occur contemporaneously, or both.

The audio processing module 220 generates a signature, or "fingerprint," of the isolated audio signal. The signature is generated by considering a characteristic of an audio waveform, such as frequency range, tempo, acoustic resonances, power in each of a plurality of frequency ranges, and the like. The generated audio signal is processed by, for example, the signature analysis module 224.

The signature analysis module 224 compares a signature generated by, for example, the audio processing module 220 to signatures in a library of signatures. If a match is found, the monitored object is identified as being the object corresponding to the library signature, as being of the object type corresponding to the library signature, as having the characteristic of the object corresponding to the library signature, or any combination thereof.

The action module 228 identifies an action to be recommended, performed, or both based on the audio signal, the generated signature, the identified object, a characteristic of the object, or any combination thereof. The action module 228 may issue a notification, via the notification module 236, to a user that recommends a particular action to perform. In one example embodiment, the action module 228 performs the identified action. The action to be performed, recommended, or both may be based on a look-up table, rules in a rule-base, and the like.

The optional training module 232 captures an audio signal derived from a sound emitted by an object, generates an audio signature using, for example, the audio processing module 220, and stores the signature for future use. The captured audio signal may be provided by, for example, the microphone 108 via the audio interface module 212, or may be obtained as a recorded audio signal, audio waveform, and the like. The generated audio signature may be indexed according to the identity of the object, the type of object, a characteristic of the object, and the like.

The notification module 236 issues recommendations determined by, for example, the action module 228. For example, the notification module 236 may issue a recommendation, such as a suggestion to turn off a washing machine or replace a tire on an automobile, to a user via the user interface module 208. The notification module 236 may activate an alarm, such as an audible alarm, a visual alarm, and the like.

Figure 3:
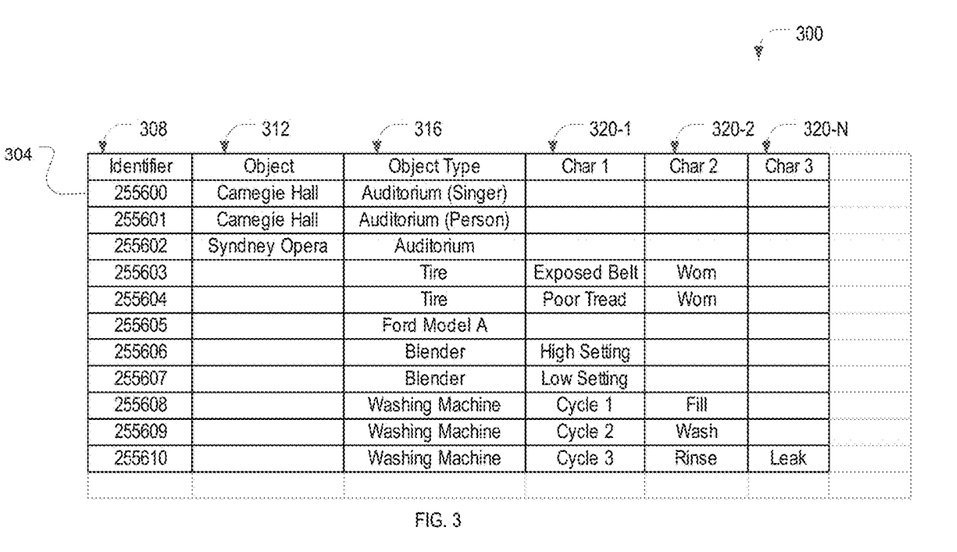
FIG. 3 is an example sound identification data structure for identifying an object, an object type, a characteristic of an object, or any combination thereof, based on an audio signature, in accordance with an example embodiment.

FIG. 3 is an example sound identification data structure 300 for identifying an object, an object type, a characteristic of an object, or any combination thereof, based on an audio signature, in accordance with an example embodiment. The sound identification data structure 300 comprises a table of metadata that, for example, maps various descriptors to a corresponding audio signature. The sound identification data structure 300 may be a table in a database and may be used to index an audio signature library. Each row 304 of the sound identification data structure 300 may correspond to an audio signature in the signature library. Column 308 is an audio signature identifier field comprising an identification number for the corresponding audio signature, column 312 is an object identification field and identifies, if known, a particular instance of the object type that corresponds to the audio signature, column 316 is an object type field comprising an identity of the type of object (such as a type of automobile) that corresponds to the audio signature, and columns 320-1, . . . , 320-N are object characteristic fields that comprise characteristics of the corresponding object.

For example, the audio signature with identifier 255600 corresponds to a singer performing in Carnegie Hall. The audio signature with identifier 255603 corresponds to a tire that is characterized by an exposed steel belt and the audio signature with identifier 255604 corresponds to a tire that is characterized by a poor tread. The audio signature with identifier 255605 corresponds to a Ford Model A automobile. The audio signatures with identifiers 255608-255610 correspond to different cycles of a washing machine. Moreover, the audio signature with identifier 255610 corresponds to a washing machine with a water leak that is performing a rinse cycle.

Figure 4:
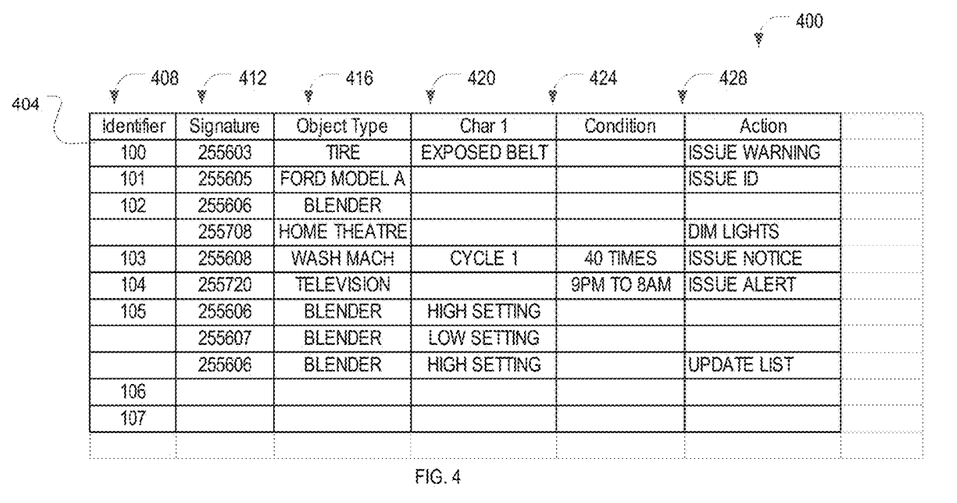
FIG. 4 is an example rule base data structure for determining an action, a recommendation, or both based on a monitored sound, in accordance with an example embodiment.

FIG. 4 is an example rule base data structure 400 for determining actions, such as issuing a recommendation, based on a monitored sound, in accordance with an example embodiment. The rule base data structure 400 may be indexed by an audio signature, an object type, a characteristic of an object, or any combination thereof. In one example embodiment, the rule base data structure 400 may be indexed by an identity of a corresponding object (not shown in FIG. 4). Each row 404 of the rule base data structure 400 may correspond to a rule for determining an action, a recommendation, or both. Column 408 is a rule identifier field, column 412 identifies one or more audio signatures that correspond to the rule, column 416 identifies the type of object that correspond to the rule (such as a type of appliance), column 420 identifies the characteristic(s) that corresponds to the rule, column 424 defines a condition for applying the corresponding rule, and column 428 defines the recommendation to be issued, action to be performed, or both.

Rule 100, for example, is directed to analyzing the sounds emitted by a tire of an automobile to, for example, identify a maintenance issue or a defect issue. For example, if the sounds emitted by the tire match the audio signature 255603, the tire is identified as having an exposed steel belt and a warning notice is issued indicating that the tire is worn and should be inspected, replaced, or both.

Rule 101, for example, is directed to analyzing the sounds emitted by an automobile to identify the make and, possibly, model of the automobile. For example, if the sounds emitted by the automobile match the audio signature 255605, a notice is issued identifying the automobile as a Ford Model A.

In one example embodiment, user behavior may be inferred from analyzing a monitored sound. Rule 102, for example, is directed to analyzing the sounds emitted by a home theatre system and a kitchen blender in a home; rule 102 is therefore based on two audio signatures: 255606 and 255708. For example, if a sound in the bass range of the home theatre system is detected, it is inferred that a movie is in progress. If sound in the bass range of the home theatre system is detected and the sound of a blender is detected, it is inferred that a party is in progress. In this case, the lights in a media room where the home theatre system is located may be automatically dimmed.

Rule 103, for example, is directed to analyzing the sounds emitted by a clothes washing machine. If the clothes washing machine has cycled on and off more than forty times (as identified by cycle 1, corresponding to audio signature 255608, occurring forty times), a recommendation to purchase additional laundry supplies may be issued.

Rule 104, for example, is directed to analyzing the sounds emitted by a television in a child's bedroom to determine if the device is being used in violation of a security policy or a parental control mechanism. For example, the usage of a television in a child's bedroom (as identified by the monitored location and frequency range of sounds in a bedroom) between 9 PM and 8 AM may indicate that the television is being used in violation of a parental rule. In one example embodiment, the parent is notified if the television is in use between 9 PM and 8 AM.

Rule 105, for example, is directed to analyzing the sounds emitted by a kitchen blender to determine the speed setting of the blender (as identified by the audio signature of the blender). For example, the audio signature of the blender may indicate a sequence of speed settings and the sequence of speed settings may indicate the particular type of food being prepared. If a high setting of the blender is followed by a low setting and then a high setting, a shopping list is updated to replace the food items consumed in the food preparation.

Rule 210 (not shown) is directed to a coffee maker that utilizes two cycles: a high-powered brewing cycle and a low-powered warming cycle. In one example embodiment, the coffee machine is monitored and a usage of the coffee maker is analyzed to determine a user's behavior, such as how much coffee the user is consuming. From the amount of coffee consumed, a time for suggesting the purchase of coffee refills may be determined. As defined in Rule 210, if the generated signature is 854950 (indicative of the brewing cycle) has been detected to last longer than a total time of 300 minutes over one or more cycles, a recommendation to purchase coffee is issued.

Figure 5:
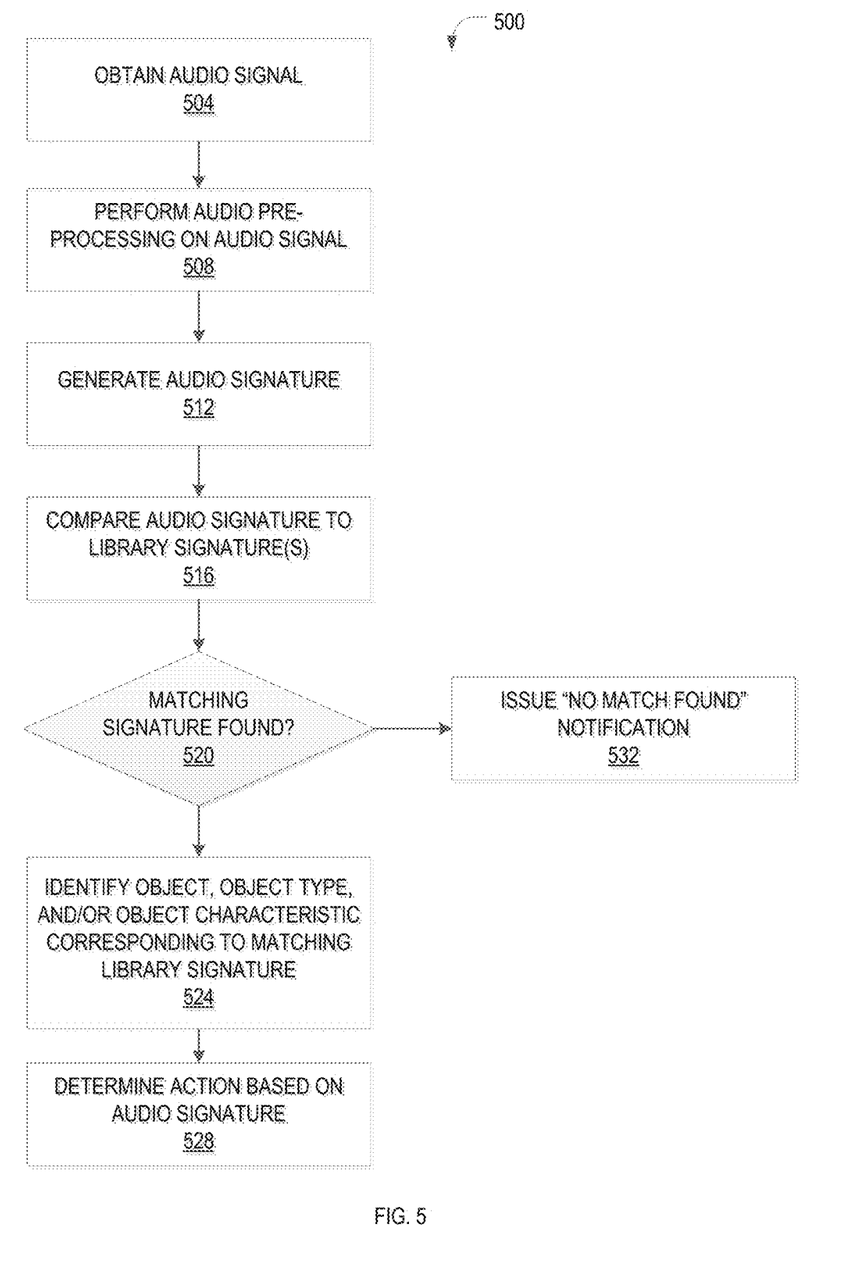
FIG. 5 is an example method for monitoring a sound and identifying an object, an object type, a characteristic of an object, or any combination thereof, based on the monitored sound, in accordance with an example embodiment.

FIG. 5 is a flowchart for a method 500 for identifying an object, an object type, a characteristic of an object, or any combination thereof, based on a monitored sound, in accordance with an example embodiment. In one example embodiment, one or more of the operations of the method 500 may be performed by the audio interface module 212, the audio pre-processing module 216, the audio processing module 220, the signature analysis module 224, the action module 228, the notification module 236, or any combination thereof.

In one example embodiment, an audio signal is obtained from, for example, the microphone 108 via, for example, the audio interface module 212 (operation 504). The captured sound may be emitted by an unknown object and may contain sounds emitted by other objects, noise generated by the environment (such as echoes), noise generated by the electronic equipment (such as the microphone), or any combination thereof.

In one example embodiment, the audio signal is optionally pre-processed to, for example, isolate a particular sound (operation 508). For example, as described above, a segment of the audio signal may be edited from a longer audio clip, a particular sound may be isolated from other sounds that occur contemporaneously, or both. The audio pre-processing module 216 may perform the optional pre-processing.

The audio signature is generated based on the audio signal (operation 512). For example, the signature is generated by considering characteristics of an audio waveform, such as a frequency range, a tempo, acoustic resonances, a power of each of a plurality of frequency ranges, and the like. The audio signature is generated by the audio processing module 220 for processing by, for example, the signature analysis module 224.

In one example embodiment, the generated signature is compared to signatures in a library of signatures by, for example, the signature analysis module 224 (operation 516). For example, characteristics of the two audio waveforms, such as the tempo of the waveforms, may be compared. A test is then performed to determine if a match is found (operation 520). If the generated signature matches none of the signatures in the library of signatures, an error notification is issued indicating that no match has been found (operation 532) and the method 500 ends; otherwise, the monitored object is identified as being the object that corresponds to the signature in the library, as being of the type of object that corresponds to the signature in the library, as having the characteristic that corresponds to the signature in the library, or any combination thereof (operation 524).

In one example embodiment, one or more recommendations are issued in a notification by, for example, the notification module 236, one or more actions are initiated or performed by, for example, the action module 228, or any combination thereof (operation 528). For example, a notification may be issued via the notification module 236 to a mobile device of a user indicating that wheel bearings in an automobile may need to be replaced. The actions, recommendations, or both may be based on the audio signature, the identified object, the identified object type, the characteristic of the object, or any combination thereof. The method 500 then ends.

Figure 6:
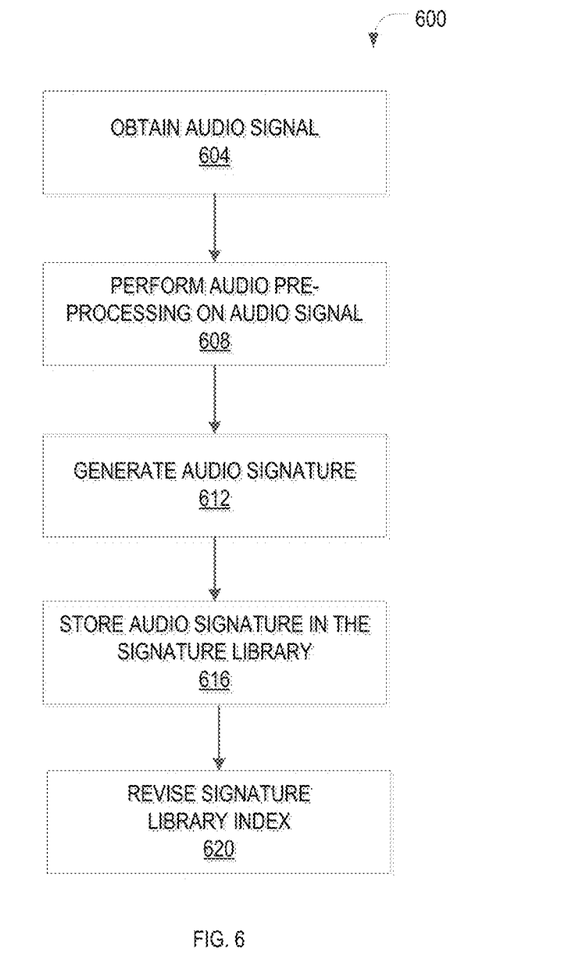
FIG. 6 is an example method for training a sound monitor, in accordance with an example embodiment.

FIG. 6 is a flowchart for a method 600 for training a sound monitor 112, in accordance with an example embodiment. In one example embodiment, one or more of the operations of the method 600 may be performed by the audio interface module 212, the audio pre-processing module 216, the audio processing module 220, the signature analysis module 224, the training module 232, or any combination thereof.

In one example embodiment, training is conducted to introduce new audio signatures into the signature library. For example, the sound emitted by a known object, such as the sound emitted by a particular model of a car, the sound emitted by ball bearings, or the cry of a baby, may be captured by the training system. In one example embodiment, a recording of the sound emitted by the object is provided to the training system. The audio signal may be optionally pre-processed (to, for example, eliminate background noise, clarify the signal, or both) and then processed to generate a signature of the audio signal. The signature is stored in the signature library and is indexed according to the identity of the object, the type of object, a characteristic of the object, and the like.

In one example embodiment, an audio signal is generated based on, for example, a sound captured by the microphone 108 via, for example, the audio interface module 212 (operation 604). The captured sound is emitted by a known object but may contain sounds emitted by other objects, noise generated by the environment (such as echoes), noise generated by the electronic equipment (such as the microphone), or any combination thereof.

In one example embodiment, the audio signal is optionally pre-processed to, for example, isolate a particular sound emitted by the known object (operation 608). For example, as described above, a segment of the audio signal may be edited from a longer audio clip, a particular sound may be isolated from other sounds that occur contemporaneously, or both. The audio pre-processing module 216 may perform the optional pre-processing.

The audio signature is generated based on the audio signal (operation 612). For example, the signature may be generated by considering characteristics of an audio waveform, such as a frequency range, a tempo, acoustic resonances, power for each of a plurality of frequency ranges, and the like. In one example embodiment, the generated signature is stored for future use in a signature library and the library index is revised by, for example, the training module 232 based upon profile information for the sound provided by a user, a software application, and the like, as described below by way of example in conjunction with FIG. 7A (operations 616 and 620). The method 600 then ends.

FIG. 7A is an example user interface 700 for monitoring a sound and identifying an object, an object type, a characteristic of an object, or any combination thereof, based on the monitored sound, in accordance with an example embodiment. The user interface 700 may be generated by, for example, the user interface module 208.

In one example embodiment, a user may select an initiate button 704 to start the monitoring process. If a file name is entered in the file field 708, the audio stored in the named file will be processed by the method 500 upon selecting the initiate button 704; if no file name is entered in the file field 708, the audio captured by the microphone 108 will be processed by the method 500 upon selecting the initiate button 704. If the pre-process button 712 is selected, optional operation 508 will be performed and the audio signal will be pre-processed. In one example embodiment, the pre-processing is automatically performed, if needed, based on the quality of the audio signal.

Upon completion of the method 500, the object (if known), the object type (if known), and one or more characteristics of the object (if known) will be displayed in the object field 716, the object type field 720, and the characteristics field 724, respectively. In addition, any applicable recommendation will be displayed in the recommendation field 728 and any action that has been initiated or performed will be displayed in the action taken field 732.

FIG. 7B is an example user interface 750 for training the sound monitor 112, in accordance with an example embodiment. The user interface 750 may be generated by, for example, the user interface module 208.

In one example embodiment, a user may select an initiate button 754 to start the training process. If a file name is entered in the file field 758, the audio stored in the named file will be processed by the method 600 upon selecting the initiate button 754, if no file name is entered in the file field 758, the audio captured by the microphone 108 will be processed by the method 600 upon selecting the initiate button 754. If the pre-process button 762 is selected, optional operation 608 will be performed and the audio signal will be pre-processed. In one example embodiment, the pre-processing is automatically performed, as needed, based on the quality of the audio signal. Once the sound has been isolated, a user may play the sound by selecting the play button 786.

Prior to storing the audio signature, the identity of the object (if known), the object type (if known), and one or more characteristics of the object (if known) are entered by the user in the object field 766, the object type field 770, and the characteristics field 774, respectively. Once the signature is generated and ready for storage, as indicated by the signature ready indicator 778, the user may add the audio signature to the signature library by selecting the store signature button 782. In one example embodiment, once the signature is generated and ready for storage, the audio signature is automatically stored in the signature library.

Although certain examples are shown and described here, other variations exist and are within the scope of the invention. It will be appreciated, by those of ordinary skill in the art, that any arrangement, which is designed or arranged to achieve the same purpose, may be substituted for the specific embodiments shown. This application is intended to cover any adaptations or variations of the example embodiments of the invention described herein. It is intended that this invention be limited only by the claims, and the full scope of equivalents thereof.

Example Mobile Device

Figure 8:
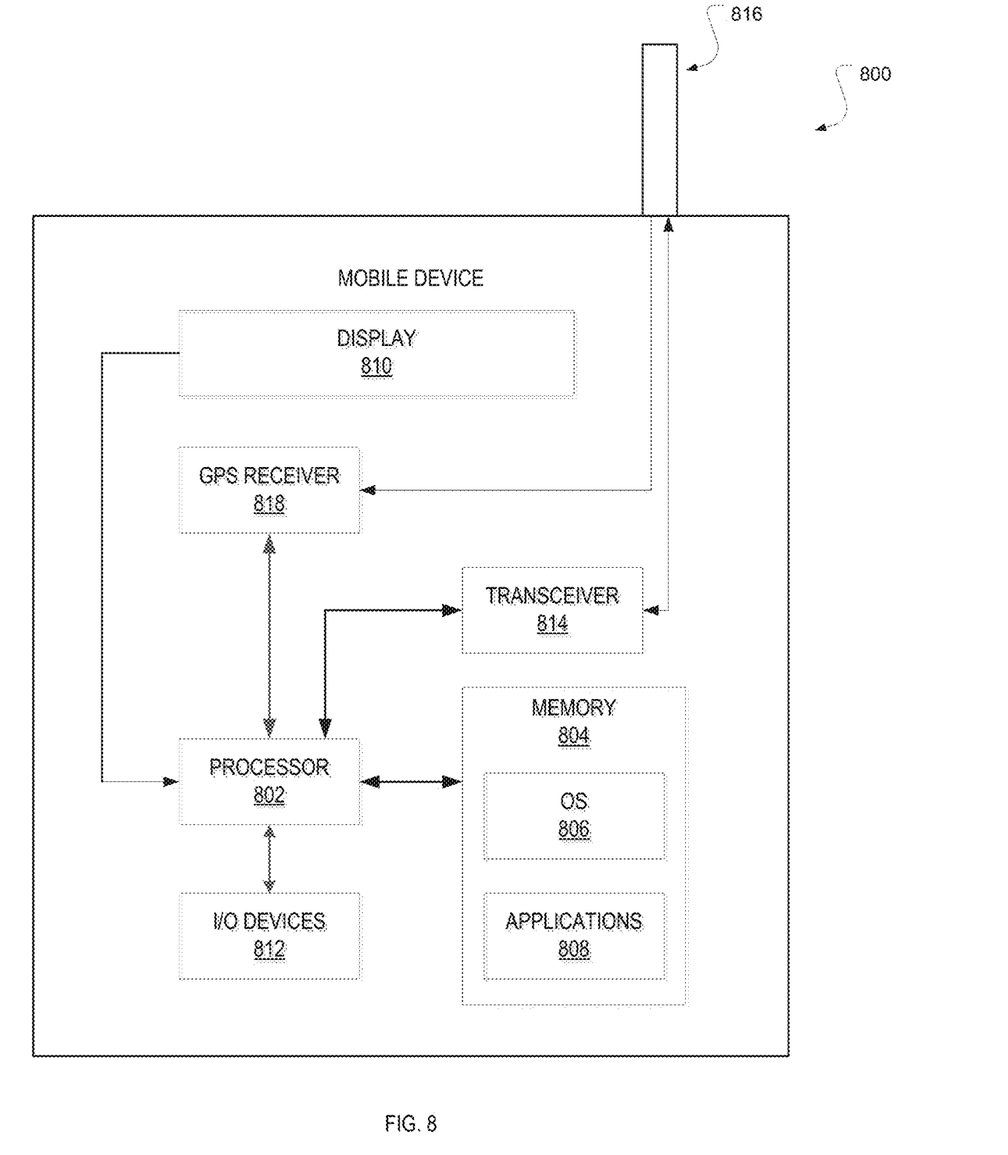
FIG. 8 is a block diagram illustrating an example mobile device, according to an example embodiment.

FIG. 8 is a block diagram illustrating an example mobile device 800, according to an example embodiment. The mobile device 800 may include a processor 802. The processor 802 may be any of a variety of different types of commercially available processors suitable for mobile devices (for example, an XScale architecture microprocessor, a microprocessor without interlocked pipeline stages (MIPS) architecture processor, or another type of processor 802). A memory 804, such as a random access memory (RAM), a flash memory, or other type of memory, is typically accessible to the processor 802. The memory 804 may be adapted to store an operating system (OS) 806, as well as application programs 808, such as a mobile location enabled application that may provide LBSs to a user. The processor 802 may be coupled, either directly or via appropriate intermediary hardware, to a display 810 and to one or more input/output (I/O) devices 812, such as a keypad, a touch panel sensor, a microphone, and the like. Similarly, in some embodiments, the processor 802 may be coupled to a transceiver 814 that interfaces with an antenna 816. The transceiver 814 may be configured to both transmit and receive cellular network signals, wireless data signals, or other types of signals via the antenna 816, depending on the nature of the mobile device 800. Further, in some configurations, a GPS receiver 818 may also make use of the antenna 816 to receive GPS signals.

Modules, Components and Logic

Certain embodiments are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In example embodiments, one or more computer systems (e.g., a standalone, client or server computer system) or one or more processors may be configured by software (e.g., an application or application portion) as a hardware-implemented module that operates to perform certain operations as described herein.

In various embodiments, a hardware-implemented module may be implemented mechanically or electronically. For example, a hardware-implemented module may comprise dedicated circuitry or logic that is permanently configured (e.g., as a special-purpose processor, such as a field programmable gate array (FPGA) or an application-specific integrated circuit (ASIC)) to perform certain operations. A hardware-implemented module may also comprise programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering embodiments in which hardware-implemented modules are temporarily configured (e.g., programmed), each of the hardware-implemented modules need not be configured or instantiated at any one instance in time. For example, where the hardware-implemented modules comprise a general-purpose processor configured using software, the general-purpose processor may be configured as respective different hardware-implemented modules at different times. Software may accordingly configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses that connect the hardware-implemented modules). In embodiments in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

Electronic Apparatus and System

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry, e.g., a field programmable gate array (FPGA) or an application-specific integrated circuit (ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Example Machine Architecture and Machine-Readable Medium

Figure 9:
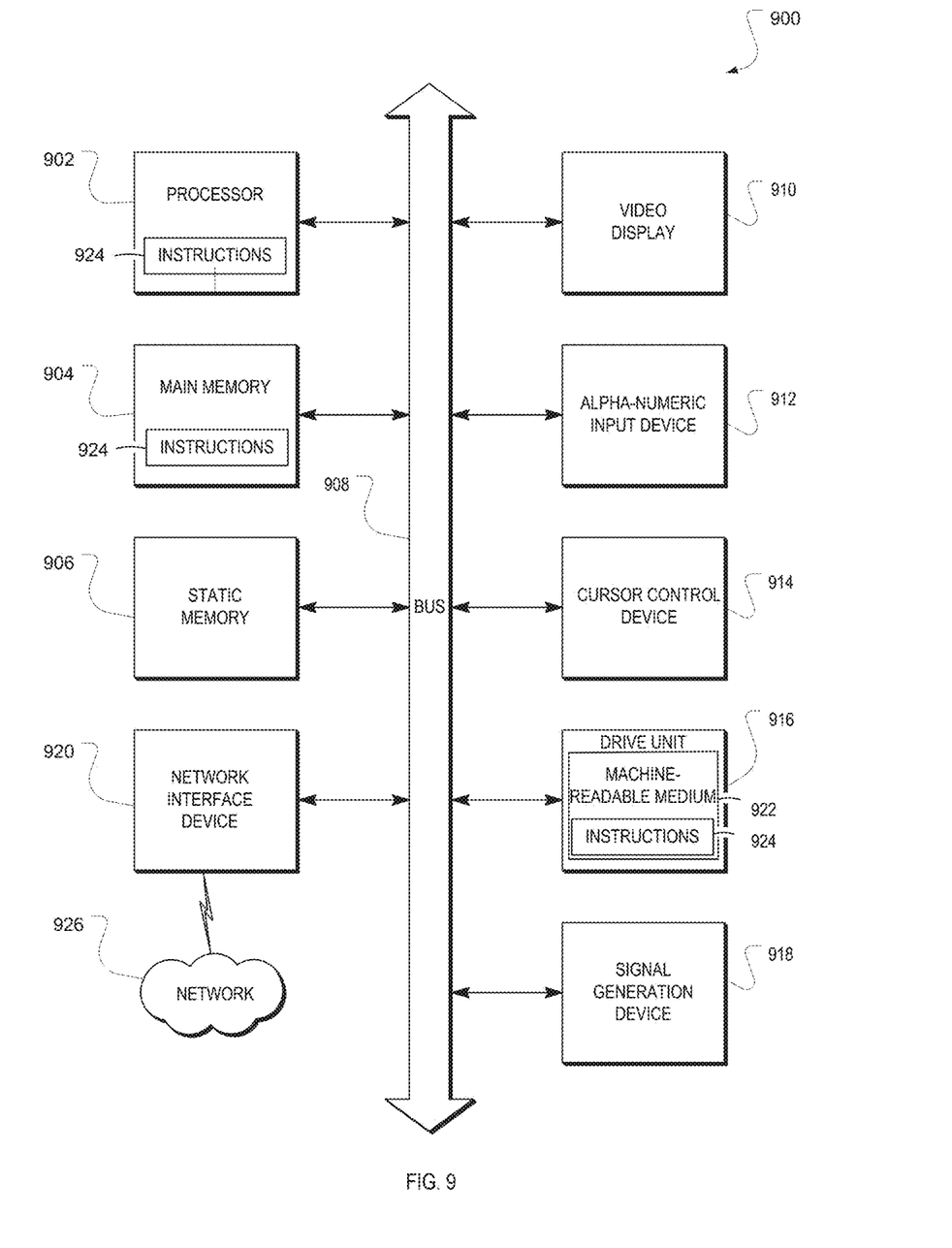
FIG. 9 is a block diagram of a machine within which instructions may be executed for causing the machine to perform any one or more of the methodologies discussed herein.

FIG. 9 is a block diagram of a machine within which instructions may be executed for causing the machine to perform any one or more of the methodologies discussed herein. In one example embodiment, the machine may be the example apparatus 200 of FIG. 2 for monitoring sound. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 910 (e.g., a liquid crystal display (LCD) or a cathode ray tube (CRT)). The computer system 900 also includes an alphanumeric input device 912 (e.g., a keyboard), a user interface (UI) navigation (or cursor control) device 914 (e.g., a mouse), a disk drive unit 916, a signal generation device 918 (e.g., a speaker) and a network interface device 920.

Machine-Readable Medium

The drive unit 916 includes a machine-readable medium 922 on which is stored one or more sets of data structures and instructions 924 (e.g., software) embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media 922. Instructions 924 may also reside within the static memory 906.

While the machine-readable medium 922 is shown in an example embodiment to be a single medium, the term "machine-readable medium" may include a single medium or multiple media (e.g., a centralized or distributed database, and/or associated caches and servers) that store the one or more data structures or instructions 924. The term "machine-readable medium" shall also be taken to include any tangible medium that is capable of storing, encoding or carrying instructions 924 for execution by the machine and that cause the machine to perform any one or more of the methodologies of the present invention, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media 922 include non-volatile memory, including by way of example semiconductor memory devices, e.g., erasable programmable read-only memory (EPROM), electrically erasable programmable read-only memory (EEPROM), and flash memory devices; magnetic disks such as internal hard disks and removable disks; magneto-optical disks; and CD-ROM and DVD-ROM disks.

Transmission Medium

The instructions 924 may further be transmitted or received over a communications network 926 using a transmission medium. The instructions 924 may be transmitted using the network interface device 920 and any one of a number of well-known transfer protocols (e.g., hypertext transfer protocol (HTTP)). Examples of communications networks 926 include a local area network ("LAN"), a wide area network ("WAN"), the Internet, mobile telephone networks, plain old telephone (POTS) networks, and wireless data networks (e.g., WiFi and WiMax networks). The term "transmission medium" shall be taken to include any intangible medium that is capable of storing, encoding or carrying instructions 924 for execution by the machine, and includes digital or analog communications signals or other intangible media to facilitate communication of such instructions 924.

Although an embodiment has been described with reference to specific example embodiments, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus comprising:
   a processor; and
   a memory to store instructions that, when executed by the processor cause the processor to perform operations comprising:
      generating an audio signature based on a received combination of a sequence of non-verbal audio signals;
      analyzing the audio signature against a plurality of stored audio signatures to identify an object that emits a combination of a sequence of sounds that matches the received combination of the sequence of non-verbal audio signals, each of the plurality of stored audio signatures being mapped to a respective object that can emit a respective non-verbal audio signal;
      responsive to identifying the object by analyzing the audio signature, determining that a number of times the combination of the sequence of non-verbal audio signals that matches the combination of the sequence of sounds emitted by the identified object has been received matches or exceeds a threshold; and
      responsive to determining that the number of times the combination of the sequence of non-verbal audio signals that matches the combination of the sequence of sounds emitted by the identified object has been received matches or exceeds the threshold, executing a search query associated with an item corresponding to the identified object.

2. The apparatus of claim 1, wherein the item comprises supplies used in connection with the identified object, wherein the operations further comprise identifying a characteristic of the identified object based on the audio signature, and generating a recommendation to purchase the supplies used in connection with the identified object.

3. The apparatus of claim 1, wherein the operations further comprise storing the audio signature in a signature library and generating an index according to an object type.

4. The apparatus of claim 1, wherein the operations further comprise recommending an activity associated with the identified object to replenish the item.

5. The apparatus of claim 1, wherein the audio signature is a first audio signature generated based on the combination of the sequence of non-verbal audio signals received at a first point in time, wherein the operations further comprise:
   generating a second audio signature based on a second non-verbal audio signal that is received at a second point in time;
   generating a compound audio signature based on a time-based record of emitted signatures corresponding to the first and second audio signatures; and
   determining a type of the object that matches the compound audio signature corresponding to a given sequence of non-verbal audio signals, wherein the search query is executed based on the compound audio signature.

6. The apparatus of claim 5, wherein determining the type of the object comprises determining a type of home appliance that emits the given sequence of non-verbal audio signals, wherein the operations further comprise detecting an abnormality with the identified object and generating a notification.

7. The apparatus of claim 1, wherein the operations further comprise automatically populating a listing template for listing an item for sale based on the identified object.

8. The apparatus of claim 1, wherein the analyzing the audio signature is performed periodically, at a prescheduled time, in response to a reception of a measurement request, or in response to a substantial change in a received audio signal, wherein the operations further comprise:
   determining an amount of the item that has been consumed based on receiving a particular sequence of non-verbal audio signals comprising the non-verbal audio signal; and
   generating a recommendation associated with replenishing the item based at least in part on the amount of the item that has been consumed.

9. The apparatus of claim 1, wherein the operations further comprise:
   retrieving a restriction comprising a restricted time period associated with the object;
   determining that the combination of the sequence of non-verbal audio signals that matches the sound emitted by the identified object has been received during the restricted time period; and
   in response to determining that the combination of the sequence of non-verbal audio signals that matches the sound emitted by the identified object has been received during the restricted time period, notifying a user about violation of the restriction.

10. The apparatus of claim 1, wherein the analyzing is based on characteristics of an audio waveform including a frequency range, a tempo, acoustic resonances, or a power in each of a plurality of frequency ranges, wherein the operations further comprise:
determining an amount of the item that has been consumed based on a duration of the combination of the sequence of non-verbal audio signals; and
generating a recommendation associated with replenishing the item based at least in part on the amount of the item that has been consumed.

11. A method comprising:
generating, by one or more processors, an audio signature based on a received combination of a sequence of non-verbal audio signals;
analyzing, by the one or more processors, the audio signature against a plurality of stored audio signatures to identify an object that emits a combination of a sequence of sounds that matches the received combination of the sequence of non-verbal audio signals, each of the plurality of stored audio signatures being mapped to a respective object that can emit a respective non-verbal audio signal;
responsive to identifying the object by analyzing the audio signature, determining that a number of times the combination of the sequence of non-verbal audio signals that matches the combination of the sequence of sounds emitted by the identified object has been received matches or exceeds a threshold; and
responsive to determining that the number of times the combination of the sequence of non-verbal audio signals that matches the combination of the sequence of sounds emitted by the identified object has been received matches or exceeds the threshold, executing a search query associated with an item corresponding to the identified object.

12. The method of claim 11, further comprising:
determining an amount of the item that has been consumed based on a duration of the combination of the sequence of non-verbal audio signals; and
generating a recommendation associated with replenishing the item based at least in part on the amount of the item that has been consumed.

13. The method of claim 11, wherein the item comprises supplies used in connection with the identified object, the method further comprising identifying a characteristic of the identified object based on the audio signature, the method further comprising generating a recommendation to purchase the supplies used in connection with the identified object.

14. The method of claim 11 further comprising storing the audio signature in a signature library and generating an index according to an object type.

15. The method of claim 11, further comprising:
retrieving a restriction comprising a restricted time period associated with the object;
determining that the combination of the sequence of non-verbal audio signals that matches the sound emitted by the identified object has been received during the restricted time period; and
in response to determining that the combination of the sequence of non-verbal audio signals that matches the sound emitted by the identified object has been received during the restricted time period, notifying a user about violation of the restriction.

16. The method of claim 11, wherein the audio signature is a first audio signature generated based on the combination of the sequence of non-verbal audio signals received at a first point in time, the method further comprising:
generating a second audio signature based on a second non-verbal audio signal that is received at a second point in time; and
generating a compound audio signature based on a time-based record of emitted signatures corresponding to the first and second audio signatures; and
determining a type of the object that matches the compound audio signature corresponding to a given sequence of non-verbal audio signals, wherein the search query is executed based on the compound audio signature.

17. The method of claim 16, wherein determining the type of the object comprises determining a type of home appliance that emits the given sequence of non-verbal audio signals, the method further comprising detecting an abnormality with the identified object and generating a notification.

18. The method of claim 11 further comprising:
determining an amount of the item that has been consumed based on receiving a particular sequence of non-verbal audio signals comprising the non-verbal audio signal; and
generating a recommendation associated with replenishing the item based at least in part on the amount of the item that has been consumed.

19. A non-transitory computer-readable medium embodying instructions that, when executed by a processor of a machine, cause the machine to perform operations comprising:
generating an audio signature based on a received combination of a sequence of non-verbal audio signals;
analyzing the audio signature against a plurality of stored audio signatures to identify an object that emits a combination of a sequence of sounds that matches the received combination of the sequence of non-verbal audio signals, each of the plurality of stored audio signatures being mapped to a respective object that can emit a respective non-verbal audio signal;
responsive to identifying the object by analyzing the audio signature, determining that a number of times the combination of the sequence of non-verbal audio signals that matches the combination of the sequence of sounds emitted by the identified object has been received matches or exceeds a threshold; and
responsive to determining that the number of times the combination of the sequence of non-verbal audio signals that matches the combination of the sequence of sounds emitted by the identified object has been received matches or exceeds the threshold, executing a search query associated with an item corresponding to the identified object.

20. The non-transitory computer-readable medium of claim 19, wherein the operations further comprise:
identifying a characteristic of the identified object based on the audio signature, and generating a recommendation to purchase supplies used in connection with the identified object.

* * * * *